(12) United States Patent
Tomamoto et al.

(10) Patent No.: US 8,241,751 B2
(45) Date of Patent: Aug. 14, 2012

(54) GLASS ROLL AND PROCESS FOR PRODUCING GLASS ROLL

(75) Inventors: Masahiro Tomamoto, Otsu (JP); Michiharu Eta, Otsu (JP); Hidetaka Oda, Otsu (JP); Tatsuya Takaya, Otsu (JP); Yasuo Yamazaki, Otsu (JP); Hiroshi Takimoto, Otsu (JP); Shinichi Ishibashi, Otsu (JP); Keiji Takagi, Otsu (JP); Daisuke Nagata, Otsu (JP); Takahide Nakamura, Otsu (JP); Toru Sakurabayashi, Otsu (JP); Katsutoshi Fujiwara, Otsu (JP); Mitsuharu Noda, Otsu (JP); Yasuhiko Ogiso, Otsu (JP); Takahide Fujii, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 3 days.

(21) Appl. No.: 13/121,324

(22) PCT Filed: Sep. 30, 2009

(86) PCT No.: PCT/JP2009/067000
§ 371 (c)(1),
(2), (4) Date: Mar. 28, 2011

(87) PCT Pub. No.: WO2010/038759
PCT Pub. Date: Apr. 8, 2010

(65) Prior Publication Data
US 2011/0200812 A1    Aug. 18, 2011

(30) Foreign Application Priority Data

Oct. 1, 2008    (JP) .................................. 2008-256509
Oct. 28, 2008   (JP) .................................. 2008-277121
Sep. 16, 2009   (JP) .................................. 2009-214860

(51) Int. Cl.
*B32B 17/06*    (2006.01)

(52) U.S. Cl. ............. 428/426; 428/34.4; 65/90; 492/57; 492/60

(58) Field of Classification Search ................. 428/34.4, 428/426; 492/57, 60; 65/90; 242/160.4, 242/520
See application file for complete search history.

(56) References Cited

U.S. PATENT DOCUMENTS
6,815,070 B1    11/2004    Bürkle et al.
(Continued)

FOREIGN PATENT DOCUMENTS
EP    2 017 300 A1    1/2009
(Continued)

OTHER PUBLICATIONS

International Preliminary Report on Patentability and Written Opinion of the International Searching Authority issued May 19, 2011 in International (PCT) Application No. PCT/JP2009/067000.

(Continued)

*Primary Examiner* — N. Edwards
(74) *Attorney, Agent, or Firm* — Wenderoth, Lind & Ponack, L.L.P.

(57) ABSTRACT

Provided is a glass roll formed by winding a glass film into a roll, in which a minimum winding radius of the glass film is optimized. Thus, the glass film is reliably prevented from breaking due to static fatigue, and is able to be stored for long periods. A glass roll (1), which is formed by winding a glass film (2) into a roll, has a configuration in which the glass film has a minimum winding radius (R) satisfying the following relation: $R \geq (T/2)[(2.3/\sigma) \times E - 1]$, where $\sigma$ represents flexural strength of the glass film (2) obtained by a 3-point bending test, T represents a thickness of the glass film, and E represents a Young's modulus of the glass film.

6 Claims, 7 Drawing Sheets

U.S. PATENT DOCUMENTS

| | | |
|---|---|---|
| 2009/0088515 A1 | 4/2009 | Yagyu et al. |
| 2009/0314032 A1 | 12/2009 | Tomamoto et al. |
| 2011/0177290 A1* | 7/2011 | Tomamoto et al. ............ 428/142 |
| 2011/0177347 A1* | 7/2011 | Tomamoto et al. ............ 428/426 |
| 2011/0200812 A1* | 8/2011 | Tomamoto et al. ............ 428/220 |
| 2011/0217521 A1* | 9/2011 | Teranishi et al. ............. 428/189 |
| 2012/0081779 A1* | 4/2012 | Paolini et al. ................. 359/296 |

FOREIGN PATENT DOCUMENTS

| | | |
|---|---|---|
| JP | 1-500990 | 4/1989 |
| JP | 2002-534305 | 10/2002 |
| JP | 2005-75433 | 3/2005 |
| JP | 2005-231657 | 9/2005 |
| JP | 2006-184741 | 7/2006 |
| JP | 2006-264786 | 10/2006 |
| JP | 2007-119322 | 5/2007 |
| JP | 2008-133174 | 6/2008 |
| WO | 87/06626 | 11/1987 |
| WO | 2006/009225 | 1/2006 |
| WO | 2007/111221 | 10/2007 |
| WO | 2008/050605 | 5/2008 |

OTHER PUBLICATIONS

International Search Report issued Nov. 24, 2009 in International (PCT) Application No. PCT/JP2009/067000.

* cited by examiner

Fig. 5a
Fig. 5b
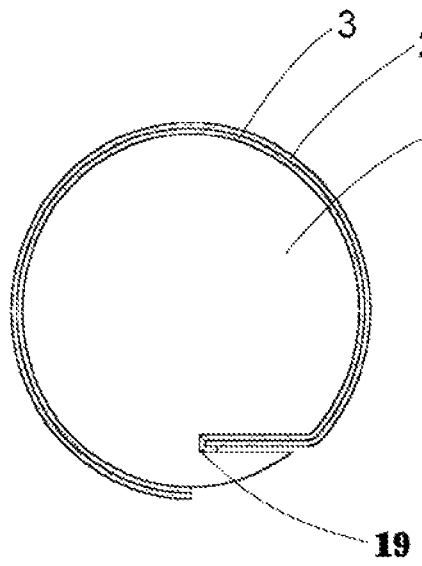
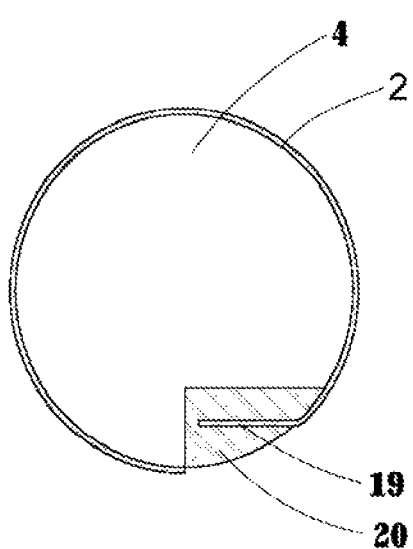
Fig. 6
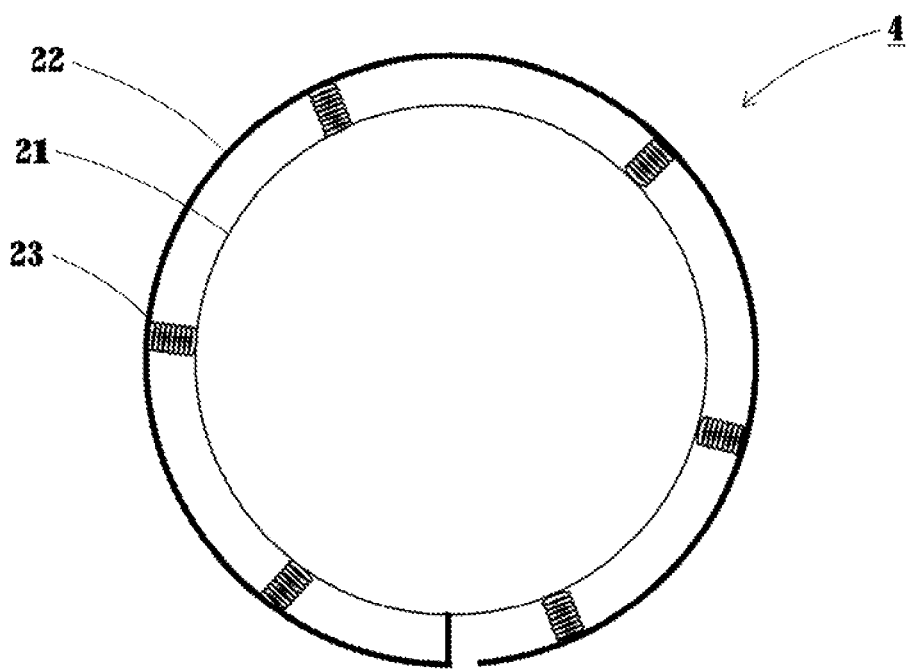

GLASS ROLL AND PROCESS FOR PRODUCING GLASS ROLL

This application is a 371 of PCT/JP2009/067000 filed Sep. 30, 2009.

TECHNICAL FIELD

The present invention relates to an improved technology for a package form for a glass film which is used as a glass substrate for a flat panel display and a solar cell, and used as cover glass or the like for an organic light-emitting diode (OLED) lighting.

BACKGROUND ART

In view of space saving, in recent years, there is widely used a flat panel display, such as a liquid crystal display, a plasma display, an organic light-emitting diode (OLED) display, or a field emission display, in place of a cathode ray tube (CRT) display. Such a flat panel display is required to be further thinned. In particular, the OLED display is required to allow easy carrying by being folded or wound, and to allow use not only on a flat surface but also on a curved surface. Thus, thinning of the OLED display is inevitably needed.

Further, it is not limited to only the display to be required to allow the use not only on a flat surface but also on a curved surface. For example it is also required to form a solar cell or an OLED lighting, on a surface of a product having a curved surface, such as a surface of a vehicle body of an automobile or a roof, a pillar, or an outer wall of a building.

Therefore, various glass plates including the flat panel display are required to be further thinned for satisfying a demand for flexibility high enough to deal with a curved surface. As disclosed, for example, in Patent Literature 1, a film-like sheet glass having a thickness of 200 μm or less has been developed.

Meanwhile, in view of ensuring flexibility, a resin film may be used in place of a glass plate. However, there is a problem in that the resin film is inferior to the glass plate in gas barrier property. In a case of the OLED display, a light-emitting body to be used is deteriorated due to contact with gas, such as oxygen or water vapor, and hence the resin film inferior in barrier property cannot be used in place of the glass plate. Further, for the same reason, also in a field other than the OLED display, the resin film cannot be used in place of the glass plate in many cases. Therefore, also in view of ensuring the barrier property described above, thinning of the glass plate takes on increasing importance in actual use.

However, when the glass plate is thinned into a film, i.e., a so-called glass film, breakage is more liable to occur. Consequently, a package form used for transportation or the like becomes a major issue. Specifically, as an ordinary package form for a sheet glass, there are known a package form (see Patent Literature 2, for example) in which glass plates and protective sheets are packaged while being alternately propped at a predetermined angle on a pallet including a back surface portion, and a package form (see Patent Literature 3, for example) in which glass plates and protective sheets are packaged while being alternately and horizontally stacked on a pallet. However, when the above-mentioned package forms are adopted to the glass film, the following problems arise.

That is, when adopting the former package form, there is a problem in that it is extremely difficult to maintain a posture in the propped state due to flexibility of the glass film. Further, even if the glass film can be propped, there is a problem in that the glass film easily breaks due to its extreme bending or concentration of stress applied on a very fragile lower end portion of the glass film.

In contrast, when adopting the latter package form, load of all glass films situated on an upper side is applied to glass films situated on a lower side, and hence there is a problem in that the glass films situated on the lower side easily break.

Note that, when glass films are packaged while being stacked in horizontal postures in an up-and-down direction, as disclosed, for example, in Patent Literature 4, there may be adopted a package form in which glass plates are stacked in the up-and-down direction at intervals. However, in this package form, the glass films need to be placed so that the glass plates are placed in a straddling manner on a plurality of support members arranged in parallel in a horizontal direction at intervals, and hence the package form is not suitable for packaging the glass film having flexibility. That is, the glass film has flexibility, and hence it is difficult to place the glass film in a straddling manner on the support members, and placing of the glass film forces a complicated operation. Further, even if the glass film can be placed, all load of the glass film is supported only by contact portions with the support members, and hence stress is concentrated on the supported portions of the glass film so that the glass film may break. Further, the glass film is bent downward due to its self-weight, and hence the glass film situated on the upper side may be held in direct contact with the glass film situated on the lower side, to thereby cause breakage.

Therefore, for the package form for a glass film, it is desired to develop an appropriate package form for a glass film, which is different from ordinary package forms for a sheet glass. In this context, for example, Patent Literature 5 discloses a new package form (hereinafter, referred to as glass roll) in which a composite film is wound into a roll together with an intermediate layer, the composite film including a glass film and a polymer layer coated on an entire one-side surface of the glass film. This package form is made focusing on flexibility of the glass film, and has various advantages such as achieving space saving, and hence the package form is focused as an appropriate package form for a glass film.

CITATION LIST

Patent Literature

Patent Literature 1: JP 2008-133174 A
Patent Literature 2: JP 2005-231657 A
Patent Literature 3: JP 2006-264786 A
Patent Literature 4: JP 2005-75433 A
Patent Literature 5: JP 2002-534305 A

SUMMARY OF INVENTION

Technical Problem

By the way, in a state of a glass roll, tensile stress acts on an outer surface of the glass film. Further, as a winding radius of the glass film is decreased toward a radially inner side of the glass roll, a degree of bending becomes steeper. Thus, the tensile stress acting on the outer surface of the glass film is increased toward the radially inner side of the glass roll. Therefore, of the glass roll, at an innermost layer at which the winding radius of the glass film is minimized, the tensile stress acting on the outer surface of the glass film is maximized.

Meanwhile, without being unpackaged, for example, for 1 month or for longer periods, the glass roll is sometimes stored as it is. In this case, during the storage period, the tensile stress acts continuously on the glass film as described above. Glass has such a characteristic that, when constant tensile stress acts continuously on the glass for long periods, the glass breaks even under relatively low stress (breaks due to static fatigue). Accordingly, when packaging the glass film in the state of the glass roll, in order to prevent breakage resulting from static fatigue under the tensile stress acting on the glass film, it is necessary to properly regulate the minimum winding radius of the glass film (which hereinafter similarly refers to the winding radius of the glass film at the innermost layer in the state of the glass roll).

However, this point is not described in Patent Literature 5. Thus, in view of adopting a glass roll as a package form for a glass film, the package form disclosed in Patent Literature 5 is still susceptible to improvement.

In view of the above-mentioned circumstances, it is a technical object of the present invention to provide a glass roll formed by winding a glass film into a roll, in which a minimum winding radius of the glass film is optimized. Thus, the glass film is reliably prevented from breaking due to static fatigue, and is able to be stored for long periods.

Solution to Problem

In general, when packaging the glass film in the state of the glass roll, a value $\sigma_0$ (Pa) of maximum tensile stress acting on the outer surface of the glass roll is given by the following formula:

$$\sigma_0 = \frac{E\frac{T}{2}}{R + \frac{T}{2}} \quad \text{[Formula 1]}$$

where R represents a minimum winding radius (mm) of the glass film, T represents a thickness (mm) of the glass film, and E represents a Young's modulus (Pa) of the glass film.

However, actually, it was impossible to quantitatively evaluate whether the glass film breaks due to static fatigue under action of how much tensile strength. In this context, as a result of earnestly making studies, the inventors of the present invention and the like found that there is a certain relationship between static fatigue strength of the glass film (upper limit strength at which breakage due to static fatigue does not occur) and flexural strength of the glass film obtained by a 3-point bending test. That is, the inventors found that it is possible to quantitatively evaluate static fatigue strength of the glass film by studying the flexural strength.

Through the process of the above-mentioned findings, the present invention, which has been made to solve the above-mentioned technical problem, provides a glass roll, which is formed by winding a glass film into a roll, and the glass film has a minimum winding radius R satisfying Formula 2 below in a case where $\sigma$ represents flexural strength of the glass film obtained by a 3-point bending test, T represents a thickness of the glass film, and E represents a Young's modulus of the glass film.

$$R \geq \frac{T}{2}\left(\frac{2.3}{\sigma}E - 1\right) \quad \text{[Formula 2]}$$

That is, based on the above-mentioned findings, the inventors of the present invention and the like found that, when the flexural strength $\sigma$ obtained by the 3-point bending test is 2.3 times or more than the tensile stress $\sigma_0$ given by Formula 1 above ($\sigma \geq 2.3\sigma_0$), breakage due to static fatigue does not occur under the tensile stress. Therefore, when Formula 1 is expressed using the above-mentioned relationship between $\sigma_0$ and $\sigma$, Formula 2 above is obtained. As a result, the minimum winding radius R is easily and reliably regulated with the flexural strength obtained by the 3-point bending test, and hence it is possible to reliably prevent the glass film from breaking due to static fatigue. Note that, the reason why an upper limit of the minimum winding radius R is not determined in Formula 2 above is as follows. As the radius is increased, tensile stress acting on the glass film is reduced. Thus, in view of preventing the glass film from breaking due to static fatigue, it is significant to determine a lower limit of the minimum winding radius R, but it is not significant to determine the upper limit thereof. In addition, the upper limit of the minimum winding radius R is determined as needed mainly depending on an external factor such as a size of a container for containing the glass roll.

In the above-mentioned configuration, it is preferred that the glass film have a thickness of 1 μm or more and 200 μm or less.

With this configuration, it is possible to impart appropriate flexibility to the glass film, and as is apparent from Formula 2 above, it is possible to reduce the minimum winding radius of the glass film. Therefore, even in a case where a reduction in a size of the entire glass roll is achieved or limitation is imposed on a size of an outermost diameter of the glass roll, it is possible to improve transportation efficiency by increasing the number of turns of the glass film.

In the above-mentioned configuration, it is preferred that each end surface in a width direction of the glass film include a cut surface which is cut by laser splitting.

With this configuration, the each end surface in the width direction of the glass film includes the cut surface cut by the laser splitting, and hence defects such as small cracks (for example, micro cracks), which may cause breakage, are less likely to occur on the each end surface in the width direction of the glass film. In other words, the each end surface in the width direction of the glass film formed by the laser splitting has a smooth cross-section with high strength. Therefore, it is possible to increase 3-point flexural strength of the glass film, which contributes to a reduction in the minimum winding radius R, compactification of the glass roll, and the like. Further, in a case of the laser splitting, the glass film is cut with use of thermal stress generated by heat of laser irradiation and cooling by refrigerant, and hence it is unnecessary to heat the glass film up to high temperature unlike in a case of fusing the glass film. Therefore, when utilizing the laser splitting, there is no such defect that the cut surface is fused to be thickened or extreme warpage occurs in the glass film due to heat at the time of cutting.

In the above-mentioned configuration, the glass film may be wound into a roll while being superposed on a protective sheet.

With this configuration, in the state of the glass roll, it is possible to suppress such a situation that one part of the glass film is held in contact with another to cause flaws and breakage.

In the above-mentioned configuration, it is preferred that the glass film be formed by a downdraw method.

With this configuration, unlike a case of forming the glass film by a float method, a surface of the glass film is not contaminated by tin or the like. Thus, there is an advantage that the glass film can be used under a state in which the surface of the glass film remains unpolished. The glass roll is targeted for a glass film having a small thickness, and hence it is also very advantageous to use the glass film with a surface remaining unpolished in terms of reducing a risk of breakage of the glass film. Note that, the downdraw method includes a slot downdraw method, an overflow downdraw method, and a redraw method. In view of ensuring smoothness of the surface of the glass film, it is preferred to adopt the overflow downdraw method or the redraw method.

The present invention, which has been made to solve the above-mentioned problems, provides a manufacturing method for a glass roll which is formed by winding a glass film into a roll, the manufacturing method including winding the glass film so that a minimum winding radius R of the glass film satisfies Formula 2 above in a case where σ represents flexural strength of the glass film obtained by a 3-point bending test, T represents a thickness of the glass film, and E represents a Young's modulus of the glass film.

According to this method, it is possible to obtain the same action and effect as the above-mentioned ones.

Advantageous Effects of Invention

As described above, according to the present invention, the minimum winding radius of the glass film is set based on the flexural strength obtained by the 3-point bending test, and hence it is possible to reliably suppress such a situation that the glass film breaks due to static fatigue in the state of the glass roll. Therefore, it is possible to reliably manufacture and provide the glass film able to be stored for long periods.

BRIEF DESCRIPTION OF DRAWINGS

FIG. 5(a) A longitudinal sectional view of a main part of a glass roll according to a second embodiment of the present invention, and illustrating a mode of holding the glass film and a protective sheet in a holding portion of a roll core.

FIG. 5(b) A longitudinal sectional view of a main part of the glass roll according to the second embodiment of the present invention, and illustrating a mode of holding only the glass film in the holding portion of the roll core.

FIG. 6 A longitudinal sectional view of the roll core to be used for a glass roll according to a third embodiment of the present invention.

DESCRIPTION OF EMBODIMENTS

In the following, embodiments of the present invention are described with reference to the attached drawings.

Figure 1:
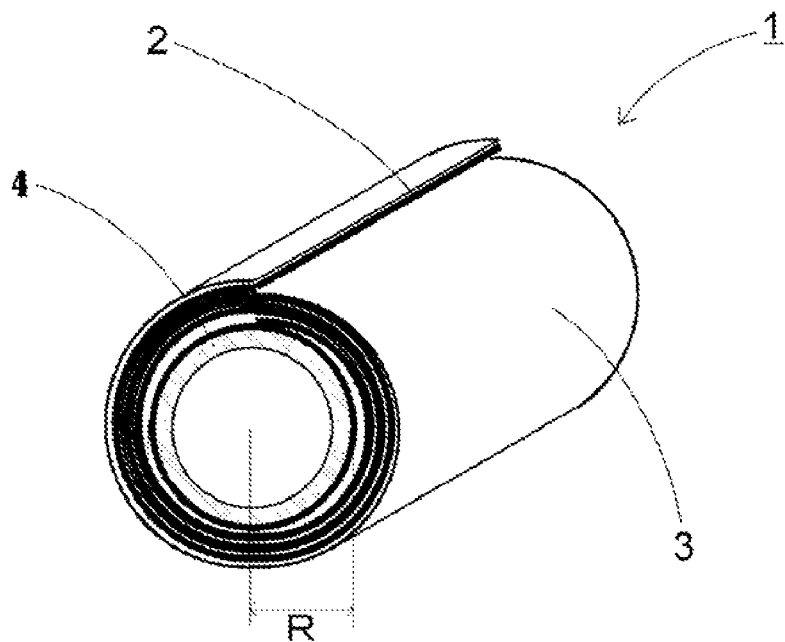
FIG. 1 A perspective view of a glass roll according to a first embodiment of the present invention.

FIG. 1 is a perspective view illustrating an entire configuration of a glass roll according to a first embodiment of the present invention. A glass roll 1 is formed by winding a glass film 2 around a roll core 4 into a roll while superposing the glass film 2 on a protective sheet 3. Note that, it is possible to omit the roll core 4 as needed. Specifically, after the glass film 2 is wound around the roll core 4 into a roll, the roll core 4 may be removed from a center of the roll. In this case, it is possible to reduce the weight of the entire glass roll 1 while keeping a state of firmly winding the glass film 2.

The glass film 2 is formed by an overflow downdraw method to have a thickness of from 1 μm to 700 μm. Note that, it is preferred that a lower limit of the thickness of the glass film 2 be 10 μm or more and an upper limit thereof be 200 μm or less. As a glass composition of the glass film 2, there can be used various glass compositions of silicate glass and the like, such as silica glass and borosilicate glass. However, it is preferred to use non-alkali glass. The reason is as follows. When the glass film 2 contains an alkali component, a phenomenon, so-called white weathering, occurs so that the glass film is structurally rough. Further, when the glass film 2 is curved, there is a risk in that the glass film is prone to break from a portion that is rough over time. Note that, herein, the non-alkali glass includes glass that does not substantially contain an alkali component, specifically, glass containing an alkali metal oxide of 1000 ppm or less (preferably, of 500 ppm or less, and more preferably, of 300 ppm or less).

When winding the glass film 2, the protective sheet 3 prevents occurrence of the flaws, which is caused by contact of one part of the glass film 2 with another, and the protective sheet is used for absorbing external pressure when the external pressure is applied to the glass roll 1. It is preferred that a thickness of the protective sheet 3 be from 10 μm to 2000 μm. At the point in time when the glass film 2 is wound to manufacture the glass roll 1, a temperature of the glass film 2 may still exceed 50° C. Thus, the protective sheet 3 needs to have heat resistance high enough to withstand transformation, for example, softening at a temperature of about 100° C. It is preferred that the protective sheet 3 be larger in dimension than the glass film 2 in the width direction, and that, in a state of the glass roll 1, the protective sheet extend beyond both sides in the width direction of the glass film 2. With this configuration, each end surface in the width direction of the glass film 2 can be protected with the protective sheet 3 in a covering manner.

To be specific, as the protective sheet 3, there may be used an ionomer film, a polyethylene film, a polypropylene film, a polyvinyl chloride film, a polyvinylidene chloride film, a polyvinyl alcohol film, a polypropylene film, a polyester film, a polycarbonate film, a polystyrene film, a polyacrylonitrile film, an ethylene vinyl acetate copolymer film, an ethylene-vinyl alcohol copolymer film, an ethylene-methacrylic acid copolymer film, a nylon film (polyamide film), a polyimide film, cellophane or other buffer materials made of resins, inserting paper, or a nonwoven fabric, for example. It is preferred that a polyethylene foam sheet be used as the protective sheet 3, because the polyethylene foam sheet can absorb impact, and has high strength with respect to tensile stress. Meanwhile, when silica or the like is dispersed in those resin films so that a degree of slip on glass is increased, the slip can preferably absorb a difference of lengths to be wound, which results from a slight difference of diameters caused when the glass film 2 and the protective sheet 3 are wound while being superposed on each other.

Further, it is preferred that conductivity be imparted to the protective sheet 3. This is because, when the glass film 2 is taken out of the glass roll 1, peeling electrification is less likely to occur between the glass film 2 and the protective sheet 3 so that the glass film 2 and the protective sheet 3 are easily peeled off. Specifically, for example, in a case where the protective sheet 3 is made of a resin, it is possible to impart the conductivity by adding a component for imparting the conductivity, such as polyethylene glycol, into the protective sheet 3. In a case where the protective sheet 3 is made of inserting paper, it is possible to impart the conductivity by adding conductive fiber. Further, it is possible to impart the conductivity also by laminating a conductive layer, such as an indium-tin-oxide (ITO) film, on a surface of the protective sheet 3.

Although the roll core 4 has a hollow cylindrical shape in this embodiment, the roll core may have a solid columnar shape. The material of the roll core 4 is not particularly limited and, for example, there can be used metals such as an aluminum alloy, a stainless steel, a manganese steel, and a carbon steel, thermosetting resins such as a phenolic resin, a urea resin, a melamine resin, an unsaturated polyester resin, an epoxy resin, polyurethane, and a diallyl terephthalate resin, thermoplastic resins such as polyethylene, polypropylene, polystyrene, an AS resin, an ABS resin, a methacrylate resin, and vinyl chloride, reinforced plastics obtained by mixing those thermosetting resins or thermoplastic resins with reinforcement fibers such as a glass fiber or a carbon fiber, and paper cores. Of the above-mentioned materials, aluminum alloy and reinforced plastic are excellent in strength, and paper allows a reduction in weight. Thus, the materials can be preferably used. In addition, it is preferred that the protective sheet 3 be wound one or more turns around the roll core 4 in advance in order to prevent occurrence of flaws on a surface of the glass film 2.

Further, in the state of the glass roll 1 having the above-mentioned configuration, a minimum winding radius R of the glass film 2 is regulated in the following manner. That is, in a case where $\sigma$ represents flexural strength of the glass film 2 obtained by a 3-point bending test (hereinafter, simply referred to as flexural strength); T, a thickness thereof; and E, a Young's modulus thereof, the minimum winding radius R of the glass film 2 (winding radius of the glass film 2 at an innermost layer) is regulated so as to satisfy Formula 2 above.

With this, it is possible to reliably prevent such a situation that, in the state of the glass roll 1, the glass film 2 breaks due to static fatigue under application of tensile stress acting on an outer surface of the glass film 2, and hence the glass film can be stored for long periods. Further, measurement of flexural strength performed by the 3-point bending test is terminated after a period of time significantly shorter than a period of time for actual breakage due to static fatigue to occur, and hence it is possible to promptly give the appropriate minimum winding radius R. Note that, the minimum winding radius R of the glass film 2 only needs to satisfy Formula 2 above.

Thus, for convenience's sake, a radius of an outer diameter of the roll core 4, which is equal to or smaller than the minimum winding radius R of the glass film 2, may satisfy Formula 2 above.

Formula 2 above is based on findings that the glass film 2 in the state of the glass roll 1 does not break due to static fatigue when a relation ($\sigma \geq 2.3\sigma_0$ is satisfied, where $\sigma_0$ represents the maximum tensile stress acting on the outer surface of the glass film 2. This basis is based on the result of experimental research of a relationship between static fatigue strength of the glass film 2 and the flexural strength obtained by the 3-point bending test. In the following, the static fatigue strength of the glass film 2 and the flexural strength are described in detail.

First, measurement of static fatigue strength is described. That is, after a scribe line is formed with a diamond cutter in a surface of a glass substrate having a thickness of 0.7 mm or 0.2 mm and the same composition as that of the glass film 2, the glass substrate is bent and broken along the scribe line to produce a glass piece with a size of 10 mm×140 mm. Next, abrasion is made by abrasive paper having predetermined roughness in a vicinity of a boundary between an end surface of the glass piece and a surface opposite to a surface with the scribe line. In this way, a test piece is prepared.

Then, the test piece is supported from below by support members having a set distance of 120 mm between support points, and a weight is placed at a middle position of support portions of the test piece for application of load so that the test piece is bent downward. In this way, constant tensile stress is applied. In this case, a plurality of test pieces are produced, and tensile stress is applied to each of the test pieces while changing only the weight of the weight. In this state, there are recorded load (weight of the weight) and a period of time for each of the test pieces to break under an environment at room temperature of 25° C. and relative humidity of 50%. Then, after 3 days, the tensile stress acting on the glass piece is determined based on the maximum load applied to an unbroken test piece. The tensile stress thus determined is referred to as static fatigue strength. Here, determination is made after 3 days because no large change is seen in the static fatigue strength even when a period of time to determine is extended over 3 days. That is, a difference of static fatigue strength is hardly seen between after 3 days and after, for example, 1 month.

Next, measurement of flexural strength performed by the 3-point bending test is described. Similarly to the measurement of static fatigue strength, a glass substrate having a thickness of 0.7 mm or 0.2 mm and the same composition as that of the glass film 2 is bent and broken with a diamond cutter. In this way, a glass piece with a size of 15 mm×85 mm is produced. Next, similarly, abrasion is made in the glass piece by abrasive paper having the same roughness as that used in the measurement of static fatigue strength. In this way, a test piece is prepared. Then, the 3-point bending test is performed on the test piece under a condition with a distance of 40 mm between support points and a crosshead speed of 0.5 mm/min. Strength when the test piece breaks is measured, and strength at a cumulative failure rate of 50% in Weibull plot distribution is referred to as flexural strength of each test piece.

Conditions for the above-mentioned test pieces according to Examples are as follows.

1. Example 1

(1) Test piece for measurement of static fatigue strength
  Size: thickness 0.7 mm×length 10 mm×width 140 mm
  Grit size of abrasive paper for end surface: #150

(2) Test piece for measurement of 3-point flexural strength
Size: thickness 0.7 mm×length 15 mm×width 85 mm
Grit size of abrasive paper for end surface: #150

2. Example 2

(1) Test piece for measurement of static fatigue strength
Size: thickness 0.7 mm×length 10 mm×width 140 mm
Grit size of abrasive paper for end surface: #320
(2) Test piece for measurement of 3-point flexural strength
Size: thickness 0.7 mm×length 15 mm×width 85 mm
Grit size of abrasive paper for end surface: #320

3. Example 3

(1) Test piece for measurement of static fatigue strength
Size: thickness 0.7 mm×length 10 mm×width 140 mm
Grit size of abrasive paper for end surface: #600
(2) Test piece for measurement of 3-point flexural strength
Size: thickness 0.7 mm×length 15 mm×width 85 mm
Grit size of abrasive paper for end surface: #600

4. Example 4

(1) Test piece for measurement of static fatigue strength
Size: thickness 0.7 mm×length 10 mm×width 140 mm
Grit size of abrasive paper for end surface: #1000
(2) Test piece for measurement of 3-point flexural strength
Size: thickness 0.7 mm×length 15 mm×width 85 mm
Grit size of abrasive paper for end surface: #1000

5. Example 5

(1) Test piece for measurement of static fatigue strength
Size: thickness 0.2 mm×length 10 mm×width 140 mm
Grit size of abrasive paper for end surface: #1000
(2) Test piece for measurement of 3-point flexural strength
Size: thickness 0.2 mm×length 15 mm×width 85 mm
Grit size of abrasive paper for end surface: #1000

Note that, in each Example, the reason why abrasion is made by the abrasive paper having the predetermined roughness is to equalize a size of a small flaw formed in the end surface in the same Example and to suppress variation of strength data. That is, the static fatigue strength and the flexural strength depend on the size of the small flaw formed in the end surface of the glass, and hence intentional formation of a flaw by the abrasive paper having the predetermined roughness aims to increase reliability of strength data.

The results of the static fatigue strength and the results of flexural strength obtained through the 3-point bending test under the above-mentioned conditions are shown in Table 1 below.

TABLE 1

| | Example 1 | Example 2 | Example 3 | Example 4 | Example 5 |
|---|---|---|---|---|---|
| Static fatigue strength (MPa) | 8.0 | 11.0 | 18.0 | 23.0 | 28.2 |
| Flexural strength (MPa) | 26.2 | 32.3 | 43.8 | 54.8 | 64.9 |
| Flexural strength/ static fatigue strength | 3.3 | 2.9 | 2.4 | 2.4 | 2.3 |

Also with reference to ratios between the static fatigue strength and the flexural strength in Table 1 above, it is possible to confirm that the flexural strength only needs to be at least 2.3 times as high as the static fatigue strength in order to obtain desired static fatigue strength. Note that, Examples 1 to 4 show the results of using the test pieces each having a thickness of 0.7 mm or 0.2 mm. However, values of the static fatigue strength and the flexural strength do not depend on the thickness, and hence this relationship does not change even if the thickness of each test piece varies.

Specifically, in a case of winding the glass film 2 (Young's modulus: 70 GPa), which is formed of non-alkali glass having a thickness of 0.7 mm, around the roll core 4 having a diameter of 1 m, when the flexural strength of the glass film 2 is 24.5 MPa ($\sigma_0$ determined from Formula 1)×2.3=56.35 MPa, the glass film 2 in the state of the glass roll 1 does not break due to the static fatigue. In other words, when the flexural strength of the glass film 2 is 56.35 MPa, it is only necessary to set the diameter of the roll core 4 to 1 m or more (strictly speaking, set the minimum winding radius R of the glass film 2 to 50 cm or more).

Similarly, in a case of winding the glass film 2 having a thickness of 0.1 mm around the roll core 4 having a diameter of 75 mm, when the flexural strength of the glass film 2 is equal to or higher than 92.5 MPa ($\sigma_0$ determined from Formula 1)×2.3=212.75 MPa, it is possible to prevent breakage due to the static fatigue from occurring. In other words, when the flexural strength of the glass film 2 is 212.75 MPa, it is only necessary to set the diameter of the roll core 4 to 75 mm or more (strictly speaking, set the minimum winding radius R of the glass film 2 to 37.5 mm or more).

Figure 2:
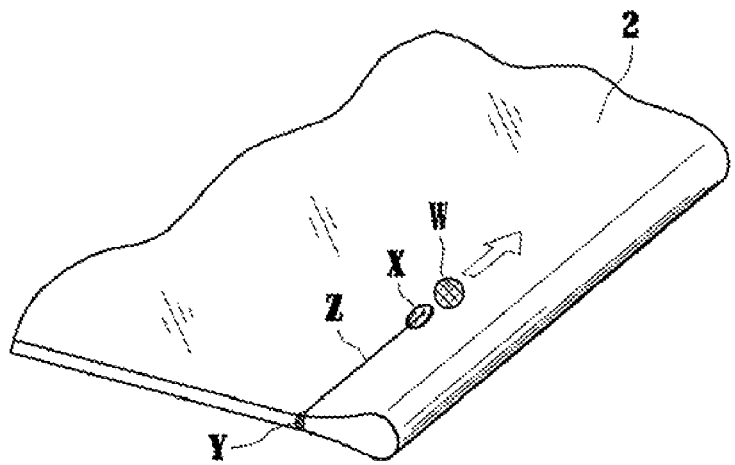
FIG. 2 An explanatory diagram illustrating a step of cutting a glass film by laser splitting.

In addition, in view of increasing the flexural strength of the glass film 2, it is preferred that an end surface of the glass film 2 (at least each end surface in the width direction) be constituted by a cut surface subjected to laser splitting. Here, the laser splitting refers to the following method. Specifically, as illustrated in FIG. 2, after scanning the glass film with a heating point W by heat of laser irradiation (not shown), the heated portion is cooled while scanning the glass film with a cooling point X of a cooling medium (for example, water) supplied from cooling means (not shown), and an initial crack Y formed in an end surface or the like of the glass film 2 is caused to develop due to the thermal stress generated by heating and cooling. In this way, a split line Z is formed, and the glass film 2 is cut along the split line Z. When the end surface of the glass film 2 is constituted by the cut surface formed by the laser splitting as described above, the end surface of the glass film 2 can have a smooth cross-section with high strength free from defects such as micro cracks. Therefore, this can contribute to an increase in the flexural strength of the glass film 2. Note that, as described below, in a case of performing the laser splitting on each end portion in the width direction of the glass film 2 while conveying the glass film 2 to a downstream side, under a state in which the heating point W heated by the laser and the cooling point X cooled by the cooling means are fixed, the glass film 2 is moved to the downstream side so that a surface of the glass film 2 is scanned with the heating point W and the cooling point X.

Further, the 3-point bending test was actually performed on test pieces (Example 6 and Example 7) each having an end surface bent and broken with a diamond cutter and a test piece (Example 8) having an end surface subjected to the laser splitting, and flexural strength was measured. Consequently, superiority of laser splitting was confirmed. Note that, in the end surface bent and broken with a diamond cutter, surface properties are different between a portion in which a scribe line is scribed and a portion in which bending and breaking are actually performed. Thus, in Example 6, the 3-point bending test was performed so that tensile stress acts on a surface with the scribe line, and in Example 7, the 3-point bending test was performed so that tensile stress acts on a surface opposite to the surface with the scribe line. The results are shown in Table 2 below. Note that, test pieces according to Examples 6 to 8 are formed of the same glass substrate having the same composition as that of the glass film 2, and each have a thickness and a size of thickness 0.7 mm×width 15 mm×length 85 mm. Further, in accordance with the above-mentioned definition, the flexural strength refers to strength at a cumulative failure rate of 50% in Weibull plot distribution.

TABLE 2

|  | Example 6 | Example 7 | Example 8 |
|---|---|---|---|
| Flexural strength (MPa) | 149 | 232 | 656 |
| Minimum winding radius (mm) | 377.8 | 253.1 | 85.5 |

Also from Table 2 above, it is possible to confirm that the flexural strength is highest in Example 8 having the end surface subjected to the laser splitting. Note that, when comparing Example 6 and Example 7 in which bending and breaking are performed with a diamond cutter, it is possible to confirm that the flexural strength is increased in a case where the glass film 2 is wound so that the surface opposite to the surface with the scribe line is positioned on an outer surface side (surface on a side opposite to the roll core 4 side is positioned on a convex curved surface side).

Further, as shown in Table 2 above, in a case of utilizing the laser splitting, in comparison with a case of utilizing bending and breaking with a diamond cutter, it is understood that the minimum winding radius R obtained from Formula 2 can be reduced to approximately one-third or less. Note that, in Table 2, the minimum winding radius R is calculated under such a condition that the thickness of the glass film 2 is 0.7 mm and a Young's modulus thereof is 70 GPa.

Next, a manufacturing device for the glass roll having the above-mentioned configuration and operation of the manufacturing device are described.

Figure 3:
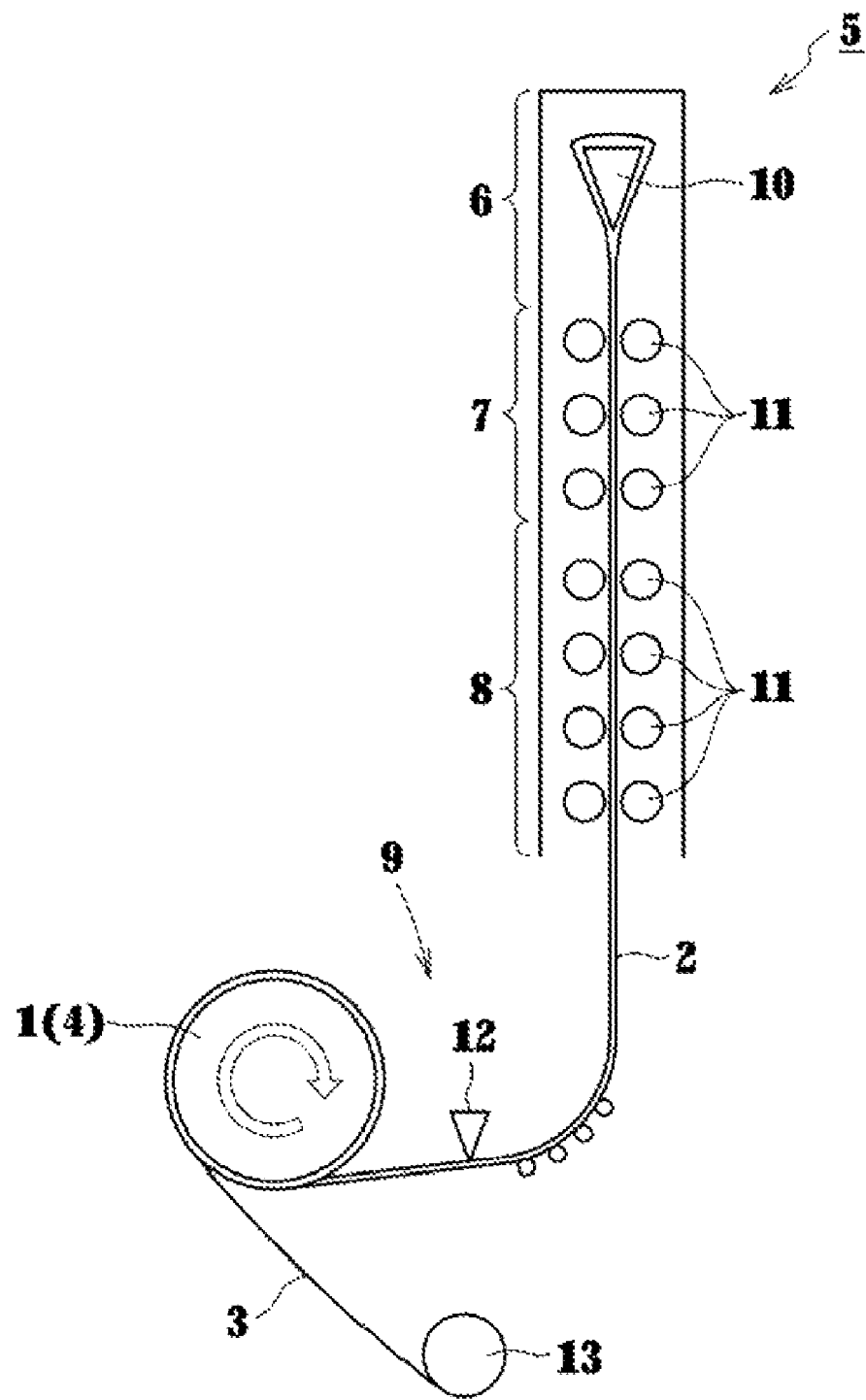
FIG. 3 A longitudinal sectional view of a manufacturing device for manufacturing the glass roll according to the first embodiment.

As illustrated in FIG. 3, a manufacturing device 5 for the glass roll forms the glass film 2 by the overflow downdraw method, and includes a forming zone 6, an annealing zone (annealer) 7, a cooling zone 8, and a processing zone 9 in the stated order from an upstream side.

In the forming zone 6, a forming trough 10 with a wedge-shaped cross-section is arranged. Molten glass supplied to the forming trough 10 is overflowed from a top of the forming trough 10, and fused at a lower end portion thereof. In this way, the glass film 2 is formed from the molten glass.

In the annealing zone 7, while annealing the glass film 2, the residual strain is removed (annealing process). In the cooling zone 8, the annealed glass film 2 is cooled sufficiently. In the annealing zone 7 and the cooling zone 8, a plurality of rollers 11 for guiding the glass film 2 downward are arranged. Note that, the uppermost rollers 11 function as cooling rollers for cooling each end portion in the width direction of the glass film 2.

In the processing zone 9, cutting means 12 for cutting (Y-cutting) the each end portion in the width direction of the glass film 2 (disused portion thickened relative to a center portion due to contact with the cooling rollers) along a conveying direction. The cutting means 12 may form the scribe line with a diamond cutter, and may cut the each end portion (disused portion) in the width direction along the scribe line by pulling the each end portion in the width direction of the glass film 2 outward in the width direction. However, in view of increasing strength of the end surface, as illustrated in FIG. 2, it is preferred to cut the each end portion in the width direction of the glass film 2 by the laser splitting. In this case, it is preferred that each end surface in the width direction of the glass film 2 cut by the laser splitting have an arithmetic average roughness Ra (compliant to JIS B0601:2001) of 0.1 μm or less (preferably, 0.05 μm or less).

Further, in the processing zone 9, the roll core 4 functioning as a winding roller is arranged. Around the roll core 4, the glass film 2 is wound, from which the each end portion (disused portion) in the width direction is cut off. In this way, the glass roll 1 is manufactured. In this case, the protective sheet 3 is sequentially supplied from a protective sheet roll 13, and the protective sheet 3 is wound around the roll core 4 while being superposed on an outer surface side of the glass film 2. Specifically, the protective sheet 3 is pulled out of the protective sheet roll 13, the protective sheet 3 is superposed on the outer surface side of the glass film 2, and the glass film 2 and the protective sheet 3 are wound into a roll along a surface of the roll core 4. Then, after the glass film 2 is wound so as to have a predetermined roll outer diameter, only the glass film 2 is cut (X-cut) in the width direction by the cutting means (not shown). Then, after a trailing end of the cut glass film 2 is wound, only the protective sheet 3 is further wound one or more turns, and the protective sheet 3 is cut. Manufacturing of the glass roll 1 is completed in a series of operations described above.

In this case, an outermost layer of the glass roll 1 is constituted by the protective sheet 3. However, in view of protection of the glass film 2, it is preferred that the protective sheet 3 be wound around the roll core 4 in advance and an innermost layer of the glass roll 1 be also constituted by the protective sheet 3.

Further, as described above, in a case where the protective sheet 3 is superposed on the outer surface side of the glass film 2, and then the glass film 2 and the protective sheet 3 are wound, the glass film 2 and the protective sheet 3 may be simultaneously cut at a stage of having the predetermined roll outer diameter. In other words, winding is performed so that the protective sheet 3 is always situated on the outer surface side of the glass film 2, and hence the outermost layer of the glass roll 1 can be constituted by the protective sheet 3 without winding only the protective sheet 3 additionally.

Note that, under a state in which the protective sheet 3 is superposed on an inner surface side of the glass film 2 (surface on the roll core 4 side, i.e., concave curved surface), the glass film 2 and the protective sheet 3 may be wound into a roll. In this case, it is preferred that, at the stage of having the predetermined roll outer diameter, after cutting only the glass film 2 in the width direction and winding the trailing end of the cut glass film, the protective sheet 3 be further wound one or more turns continuously and then the protective sheet 3 be cut.

In the processing zone 9, when winding the glass film 2 around the roll core 4, the glass film 2 is wound so that the minimum winding radius R of the glass film 2 satisfies Formula 2 above. With this, the minimum winding radius R of the glass film 2 is optimized, and the glass roll 1 formed by winding the glass film 2 is prevented from breaking due to static fatigue. Specifically, the glass film 2 manufactured under the same manufacturing condition is taken out as appropriate, and the 3-point bending test is performed on the taken-out glass film 2 as a test piece. In this way, flexural strength is measured. Then, based on the flexural strength, the minimum winding radius R of the glass film 2 is determined from Formula 2. Note that, as long as the same manufacturing condition is maintained, without newly performing the 3-point bending test on another glass film 2 manufactured under the manufacturing condition, each glass film 2 manufactured under the same condition has substantially the same flexural strength. Therefore, also in another glass film 2 manufactured under the same condition, when the glass film 2 is wound to have the same minimum winding radius R or more, it is possible to prevent ex-post breakage of the glass roll 1 due to static fatigue, which allows long storage.

Figure 4A:
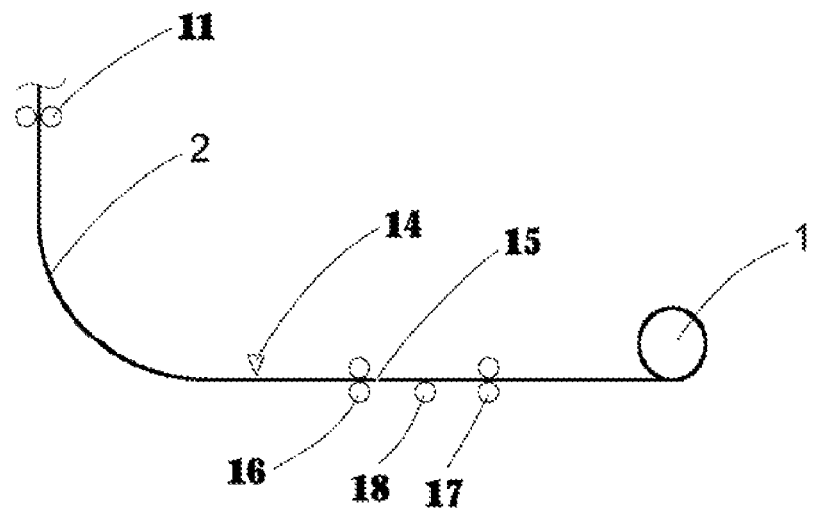
FIG. 4(a) An explanatory diagram illustrating a step of cutting the glass film in a width direction by the manufacturing device illustrated in FIG. 3, and illustrating a state at an early stage of the cutting step.
Figure 4B:
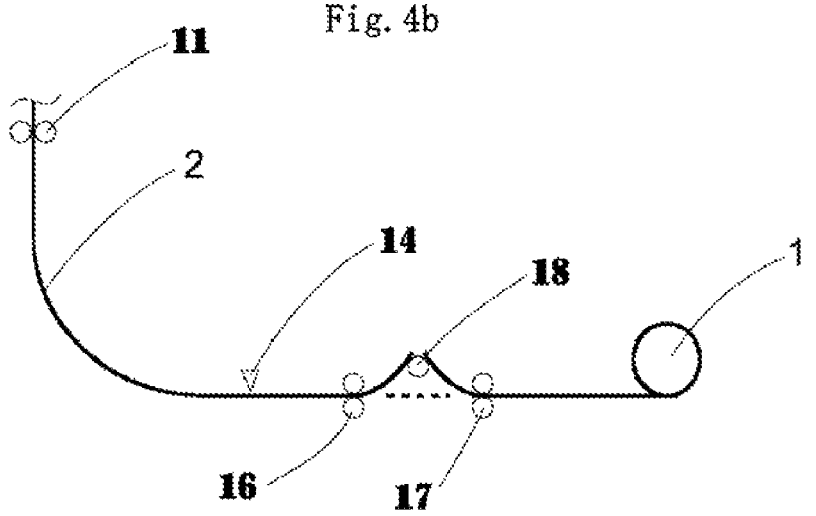
FIG. 4(b) An explanatory diagram illustrating the step of cutting the glass film in the width direction by the manufacturing device illustrated in FIG. 3, and illustrating a state at a middle stage of the cutting step.
Figure 4C:
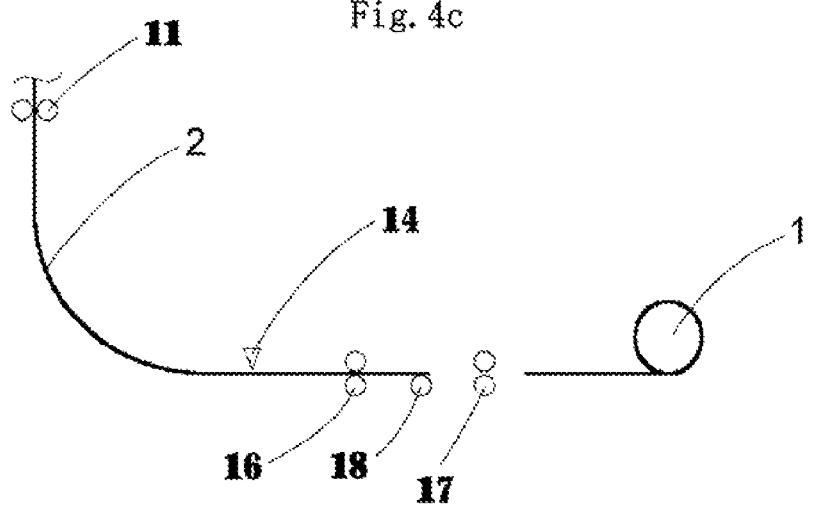
FIG. 4(c) An explanatory diagram illustrating the step of cutting the glass film in the width direction by the manufacturing device illustrated in FIG. 3, and illustrating a state at a latter stage of the cutting step.

The glass film 2 is rich in flexibility due to its thinness. Thus, it is difficult to bend and break the glass film in the width direction by an ordinary method, and hence it is preferred to bend and break the glass film in the width direction by a method illustrated in FIGS. 4(*a*) to 4(*c*). That is, as illustrated in FIG. 4(*a*), after a scribe line 15 is formed in the width direction by the cutting means 14, the glass film 2 is conveyed as it is, and the scribe line 15 passes pre-cutting rollers 16. Then, as illustrated in FIG. 4(*b*), rotation speed of post-cutting rollers 17 and winding speed of the glass roll 1 are slowed relative to rotation speed of the pre-cutting rollers 16, and a cutting roller 18 is lifted up from a conveyance line by drive means (not shown). As a result, the portion with the scribe line 15 of the glass film 2 subjected to bending is raised upward and bent, and the bending and breaking are performed through concentration of stress generated at this time. Then, the cutting roller 18 is lowered, and the winding speed of the glass roll 1 is increased after the post-cutting end portion passes the post-cutting rollers 17 as illustrated in FIG. 4(*c*). Thus, the glass roll 1 and the roll core 4 are replaced simultaneously with completion of the winding, and then the processing is sequentially performed. Note that, cutting of the glass film 2 in the width direction may be also performed utilizing the above-mentioned laser splitting.

FIGS. 5(*a*) and 5(*b*) are views of a main part of a glass roll according to a second embodiment of the present invention. The second embodiment is different from the first embodiment in that a holding groove 19 for holding an end portion of the glass film 2 is provided in the roll core 4. At the time of start of winding the glass film 2 around the roll core 4, it is difficult to wind the end portion of the glass film 2 along the roll core 4. If winding forcibly, overstress is applied to the end portion to be wound first of the glass film 2 so that the glass film may break. However, when the holding groove 19 is provided, it is possible to eliminate such a situation. Specifically, in a case where winding of the glass film 2 is started after inserting the glass film and the protective sheet in the holding groove 19 simultaneously while the end portion of the glass film 2 is covered with the folded protective sheet 3 as illustrated in FIG. 5(*a*), or in a case where the holding groove 19 is made of a cushioning material 20 as illustrated in FIG. 5(*b*), winding of the glass film 2 can be smoothly started by starting the winding after inserting only the glass film 2.

FIG. 6 is a side view of the roll core to be used for a glass roll according to a third embodiment of the present invention. The roll core 4 according to the third embodiment is different from the roll core 4 according to the first and second embodiments in that the roll core 4 is easily removed from the glass roll 1. Specifically, the roll core 4 includes an inner cylinder 21 and an outer cylinder 22, which form coaxial sleeves having a double-circle shape, and includes elastic members 23 interposed between the inner cylinder 21 and the outer cylinder 22. With this configuration, when pressing the outer cylinder 22 in a center direction, the elastic members 23 contract so that the outer cylinder 22 is reduced in diameter. Consequently, it is possible to easily remove the roll core 4 from the glass roll 1. Note that, instead of interposing the elastic members 23 between the inner cylinder 21 and the outer cylinder 22, when adopting a configuration in which a space within the inner cylinder 21 and the outer cylinder 22 is sealed and the outer cylinder 22 is caused to expand and contract in a radial direction by changing fluid pressure in the internal space, it is possible to obtain the same effect.

Figure 7:
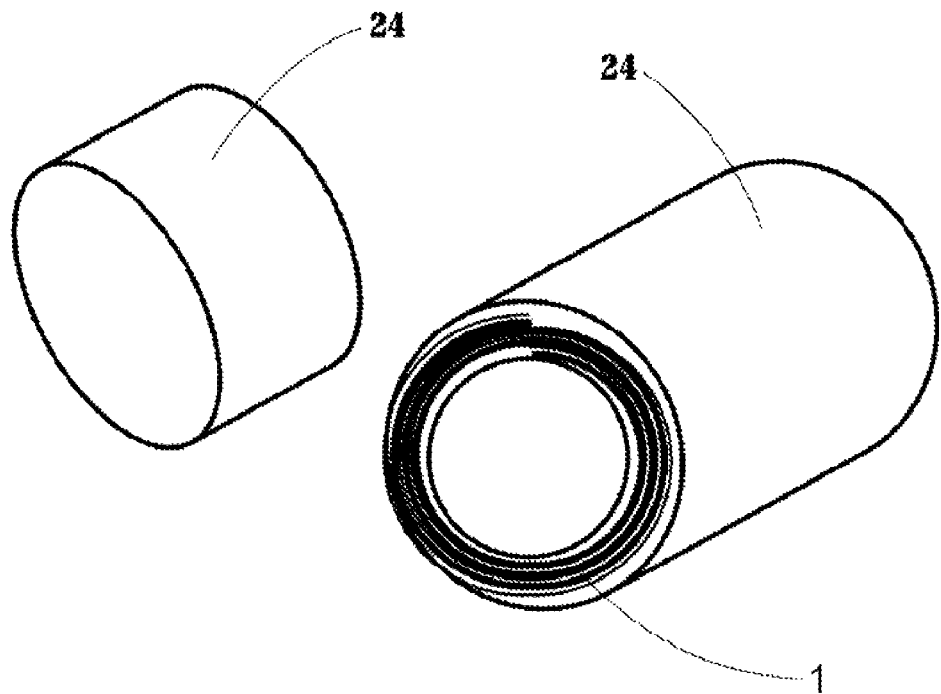
FIG. 7 A perspective view of a glass roll according to a fourth embodiment of the present invention.

FIG. 7 is a perspective view of a glass roll according to a fourth embodiment of the present invention. The glass roll 1 according to the fourth embodiment is different from the glass roll 1 according to the first to third embodiments in that a periphery of the glass roll 1 is protected with an outer covering body 24. Specifically, the glass roll 1 is received inside the cylindrical outer covering body 24, and internal gas is replaced with clean gas. In this way, it is possible to maintain cleanness of the glass film 2. Therefore, for use as a glass substrate for a display such as a liquid crystal display or an OLED display, which is required to be highly clean and free from adhesion of dust, dirt, and the like, it is possible to provide the glass film 2 satisfying the requirement. Note that, cleanness of the glass film 2 may be ensured in such a manner that, in a clean room, a flat-plate-shaped lid body is swaged and fastened to a cylinder body receiving the glass roll 1 therein, and canning sealing is performed. Further, a clean state may be maintained in such a manner that the glass roll 1 is packaged with a shrink film in the clean room.

Figure 8:
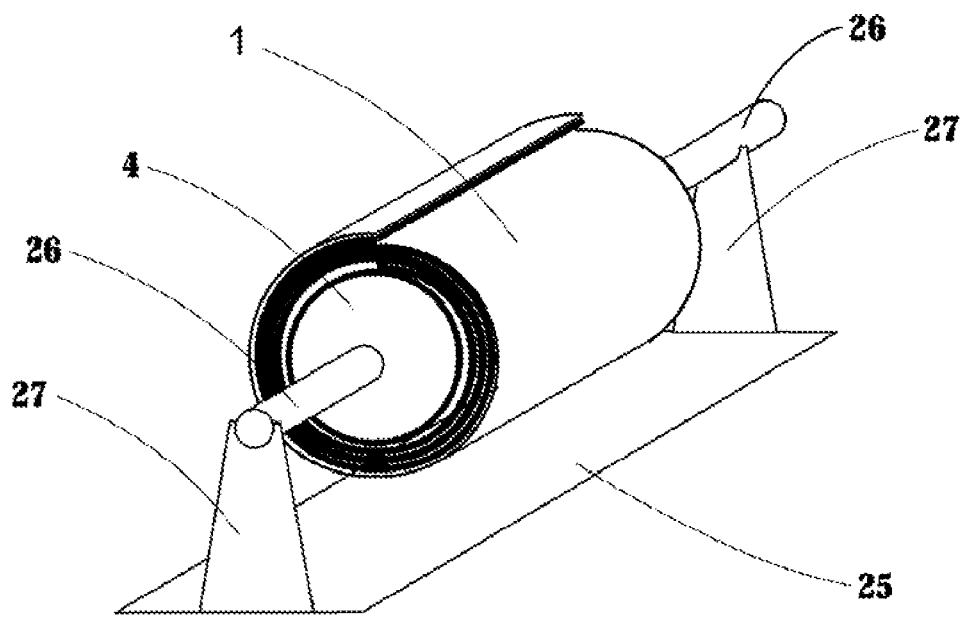
FIG. 8 A perspective view of a glass roll according to a fifth embodiment of the present invention.

FIG. 8 is a perspective view of a glass roll according to a fifth embodiment of the present invention. The glass roll 1 according to the fifth embodiment is different from the glass roll 1 according to the first to fourth embodiments in that a pedestal 25 for holding the glass roll 1 in a laid posture (horizontal posture in the illustrated example) is provided. Specifically, a shaft portion 26 protruding from both ends of the roll core 4 is provided, and the shaft portion 26 protruding from the roll core 4 is supported by bearings 27 provided to the pedestal 25. Under this state, the glass roll 1 is positioned away from an upper surface of the pedestal 25. With this configuration, the glass film 2 of the glass roll 1 is not held in direct contact with the upper surface of the pedestal 25, and hence it is possible to prevent the glass roll from breaking from a placed surface side as in a case of placing the glass roll 1 directly. Note that, it is preferred that, after the glass roll 1 is arranged on the pedestal 25, the entire glass roll be covered with a packaging box (not shown). This is because a clean state can be maintained by replacing the air inside the packaging box with clean air. In this case, every single glass roll 1 may be packaged in the packaging box, or a plurality of glass rolls 1 may be packaged in one packaging box together. In addition, by adopting a mode of taking the glass roll in and out of the packaging box in such a manner that the pedestal 25 is fixed in the packaging box and the shaft portion 26 of the glass roll 1 is hung by a crane or the like, the pedestal 25 is firmly fixed in the packaging box during transportation, and hence excellent safety is provided.

Figure 9:
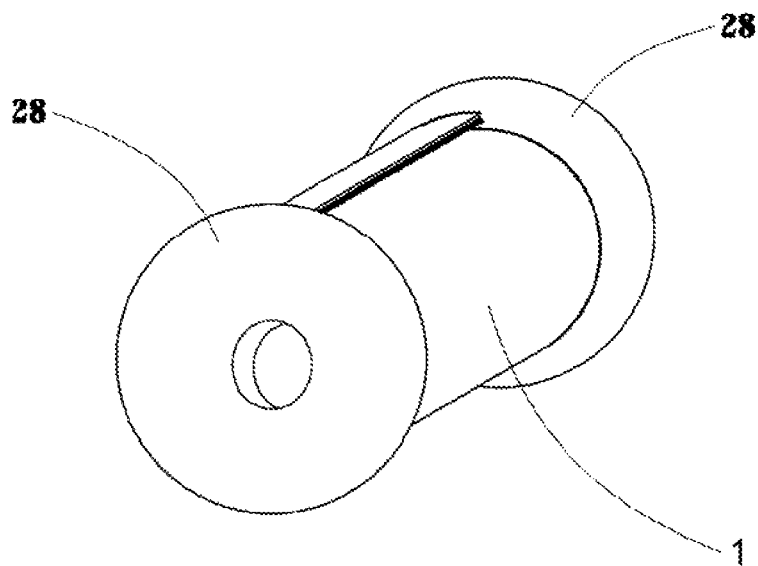
FIG. 9 A perspective view of a glass roll according to a sixth embodiment of the present invention.

FIG. 9 is a perspective view of a glass roll according to a sixth embodiment of the present invention. The glass roll 1 according to the sixth embodiment is different from the glass roll 1 according to the fifth embodiment in that flanges 28 are provided to both end portions of the roll core 4, respectively, so as to prevent the glass film 2 from being held in direct contact with the placed surface. Note that, though the flanges 28 illustrated in FIG. 9 have circular shapes, flanges may have polygonal shapes. In this case, it is possible to prevent the glass roll 1 from rolling when being placed on a floor surface. Further, the flanges 28 may be removably attached to the roll core 4. In this case, it is preferred that only the roll core 4 be used at the time of winding and rewinding, and the flanges 28 for protecting the glass film 2 be attached during transportation and storage. Moreover, in a case where the glass film 2 is slid on the roll core 4 during transportation or the like, there is a risk in that an end surface of the glass film 2 comes into contact with the flange 28 so that the glass film may break. Therefore, it is preferred that a width of the protective sheet 3 be larger than a width of the glass film 2. The reason is as follows. When the width of the protective sheet 3 is large, even if the glass film 2 is slid on the roll core 4, the end surface of the glass film 2 is less likely to come into direct contact with the flange 28, and hence it is possible to reliably prevent breakage of the glass film 2. Note that, it is preferred that inner surfaces of the flanges 28 be also protected with members having a cushioning action.

Figure 10:
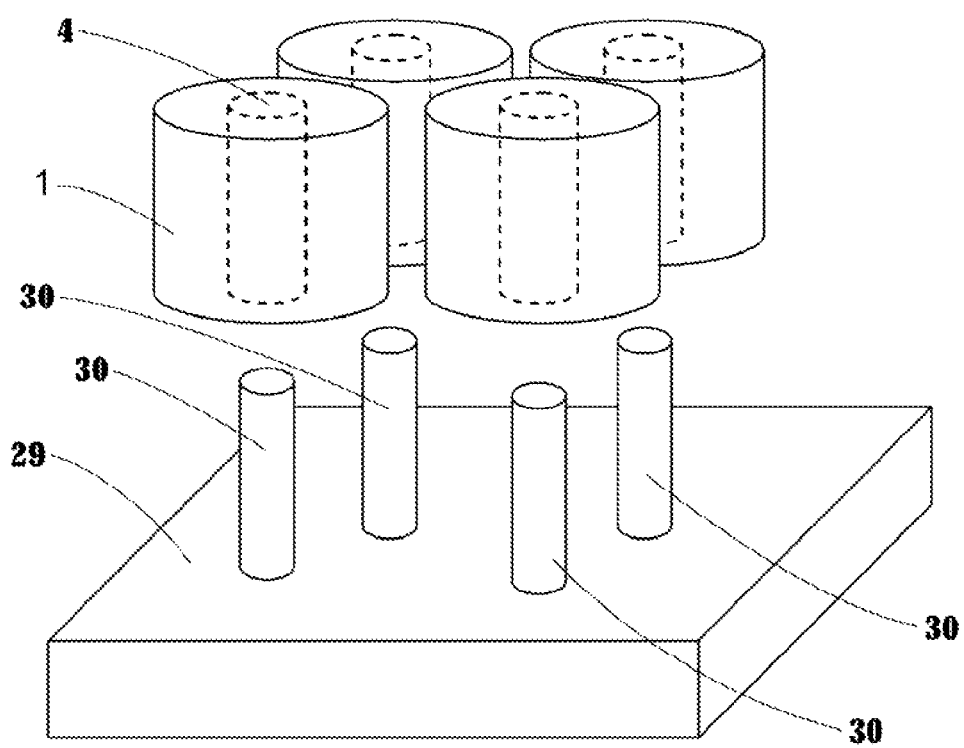
FIG. 10 A perspective view of a glass roll according to a seventh embodiment of the present invention.

FIG. 10 is a perspective view of a glass roll according to a seventh embodiment of the present invention. The glass roll 1 according to the seventh embodiment is different from the glass roll 1 according to the fifth and sixth embodiments in that a pedestal 29 for holding the glass roll 1 in an upright posture (vertical posture in the illustrated example) is provided. The pedestal 29 includes columnar portions 30 provided upright on an upper surface of the pedestal. Further, the glass roll 1 is placed in the upright posture on the pedestal 29 by inserting each of the columnar portions 30 into the roll core 4 of the glass roll 1. In this way, even if the glass roll 1 is shaken during transportation, the glass roll 1 is fixed by each of the columnar portions 30, and hence it is possible to prevent breakage of the glass film 2, which results from impact of the glass roll on another glass roll. It is preferred that the columnar portions 30 be removably attached to the pedestal 29. Removable attachment can facilitate loading and unloading of the glass roll 1. The columnar portions 30 are provided upright with intervals large enough to prevent the impact of the glass roll 1 on another glass roll when the glass roll 1 is placed. In order to prevent shaking during transportation, a cushioning material may be filled between the glass rolls 1. It is preferred that the pedestal 29 be provided with a hole for a forklift. Further, with provision of a box body (not shown), strict package is possible.

Note that, the present invention is not limited to the above-mentioned embodiments, and various embodiments can be implemented. For example, an end surface of the glass film 2 may be protected with a resin film or the like. In this case, the glass roll 1 is produced by superposing the resin film on each end surface of the glass film 2 in a region within 1 to 2 cm from the each end surface and winding the resin film and the glass film. Further, in a case of using an adhesive resin film, even when a crack occurs in the end surface of the glass film 2, it is possible to prevent development of the crack. Further, instead of protecting the end surface of the glass film 2 with the resin film, the region within 1 to 2 cm from the end surface may be coated with a protective layer. As the protective layer, there can be used, for example, polyester, polycarbonate, polyvinyl, polyethylene, polyetherimide, polyamide, polyacrylate, polymethacrylate, polysiloxane, polyvinyl alcohol, polyvinyl acetate, a cellulose-based polymer, an epoxy resin, polyurethane, a phenolic resin, a melamine resin, and a urea resin. It is possible to provide those protective layers through application with spray, application with a roller, sticking of the above-mentioned resin film, or the like.

Further, the resin film may be attached at the time of start of winding of the glass film 2 (leading end) and at the time of end of winding (trailing end). In this way, each of the leading end and the trailing end of the glass film is protected with the resin film. Thus, even when supplying the glass roll 1 to various steps under a state in which the leading end or the trailing end of the glass film 2 is directly held, the glass film 2 is less likely to break. The resin film is superposed and attached onto each of the leading end portion and the trailing end portion of the glass film 2 in the region within approximately 1 to 2 cm from each of the leading end portion and the trailing end portion, and then winding is performed so that the glass roll 1 is obtained. A length of the resin film is not particularly limited. For example, the length of the resin film may be set to correspond to a length of a contour of the glass roll 1. Further, it is preferred that the resin film have adhesiveness and an elastic modulus smaller than that of the glass film 2.

Further, FIG. 3 illustrates a mode in which the protective sheet roll 13 is arranged below the glass film 2, and the protective sheet 3 is pulled out upward. However, there may be adopted a mode in which the protective sheet roll 13 is arranged above the glass film 2, and the protective sheet 3 is pulled out downward. Further, FIG. 3 illustrates the following mode of winding the glass film 2. Specifically, after the glass film 2 that is being conveyed downward in a substantially vertical direction from a forming section is curved and changed into a substantially horizontal posture while being supported by support rollers from below, the glass film 2 that is being conveyed in the posture is wound. However, there may be adopted a mode of winding the glass film 2 that is being conveyed downward in the substantially vertical direction as it is.

Further, FIG. 3 illustrates a mode of winding a long product, in which forming and winding are performed sequentially. In a case of winding a short product, after the glass film 2 is cut into a plurality of pieces by a predetermined length in advance, the plurality of cut glass films 2 may be wound by batch processing. Further, a plurality of short products may be wound into one glass roll 1.

In addition, in the above description, description is made of the case where the glass film 2 is formed by the overflow downdraw method. However, the glass film may be formed by a slot downdraw method or a redraw method.

Figure 11:
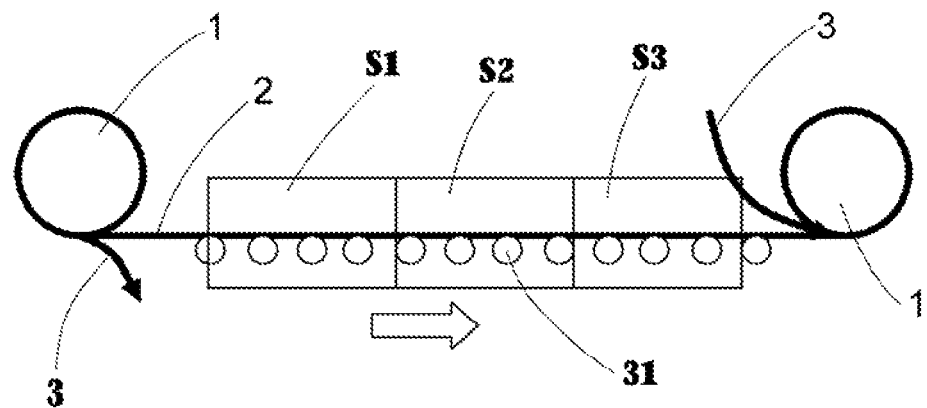
FIG. 11 A side view illustrating a processing method for a glass roll according to the present invention.
Figure 12:
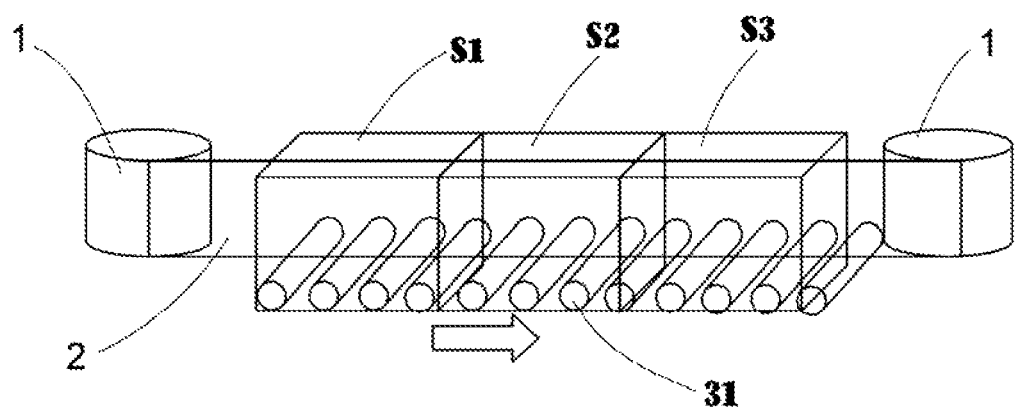
FIG. 12 A side view illustrating another processing method for the glass roll according to the present invention.

In addition, when performing processing, such as cleaning and drying, on a glass substrate, only one-by-one conveyance is possible for a conventional rectangular glass substrate. However, in a state of the glass roll 1 formed by winding the glass film 2 into a roll, the glass roll can be subjected to sequential processing using the roll-to-roll method. For example, by a method illustrated in FIG. 11, it is possible to perform sequential processing, i.e., a cleaning step S1, a drying step S2, and an antistatic step S3, using the roll-to-roll method. The glass film 2 has flexibility, and hence it is possible to soak the glass roll in a cleaning tank in the cleaning step S1. When the glass roll 1 according to the present invention is subjected to sequential processing using the roll-to-roll method, it is preferred that, as illustrated in FIG. 12, the sequential processing be performed under a state in which the glass roll 1 is placed upright. The glass film 2 has rigidity higher than that of the resin film, and hence the roll-to-roll method can be implemented under a state in which a sheet is placed upright. When the roll-to-roll method is implemented under the upright state, satisfactory drainage is achieved after the completion of the cleaning step, and conveying rollers 31 and a surface of the glass film 2 are not held in contact with each other. Thus, it is possible to more reliably prevent occurrence of flaws. Note that, in the processing method illustrated in FIG. 12, when the glass film 2 flutters, an upper portion of the glass film 2 may be supported by a conveying roller (not shown) provided as needed.

Figure 13:
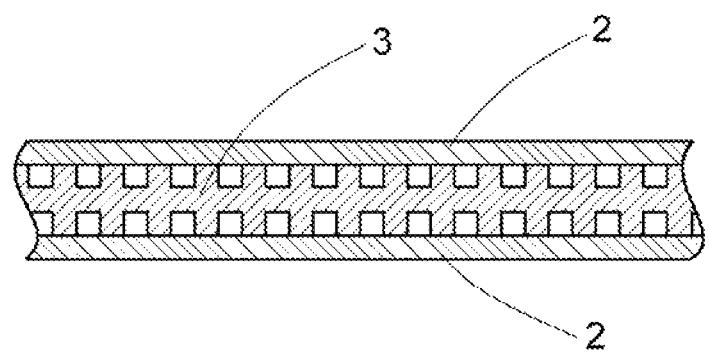
FIG. 13 A longitudinal sectional view of the protective sheet having a surface subjected to embossing.

At this time, when using the glass roll 1, which is not dried sufficiently after the cleaning, in a step in which moisture is to be excluded strictly, it is necessary to exclude moisture adhering to a surface of glass before using the glass roll, and hence it is necessary to dry the glass roll 1 in a roll state sufficiently before the glass roll 1 is introduced into the step. In this case, as illustrated in FIG. 13, it is preferred to use the protective sheet 3 having a surface with asperities, which is subjected to embossing or the like. The reason is as follows. A surface of the protective sheet 3 is not entirely held in contact with the glass film 2, and hence the protective sheet is excellent in breathability and allows fast drying of the glass film 2. Further, it is preferred that the roll core 4 have a structure excellent in breathability with provision of a hole, a slit, or a mesh. In addition, it is preferred that a heater be arranged on a hollow portion of the roll core 4 and drying be performed by heating from an inside of the roll core 4. After the drying, the glass roll 1 is sealed, for example, in the outer covering body 24 illustrated in FIG. 7, and a desiccant or the like is put inside the outer covering body. In this way, the dried state can be maintained. Further, an end surface of the glass roll 1 can be provided with a sheet-like desiccant (for example, sheet containing silica gel), and be covered with a moisture-proof film (such as metal layer deposited film).

REFERENCE SIGNS LIST

| | |
|---|---|
| 1 | glass roll |
| 2 | glass film |
| 3 | protective sheet |
| 4 | roll core |
| 6 | forming zone |
| 7 | annealing zone |
| 8 | cooling zone |
| 9 | processing zone |
| 10 | forming trough |
| 11 | roller |
| 12 | cutting means (for Y-cutting) |
| 13 | protective sheet roll |
| 14 | cutting means (for X-cutting) |
| 16 | pre-cutting roller |
| 17 | post-cutting roller |
| 18 | cutting roller |

The invention claimed is:

1. A glass roll, which is formed by winding a glass film into a roll,
   wherein the glass film has a minimum winding radius (R) satisfying the following relation:

$$R \geq \frac{T}{2}\left(\frac{2.3}{\sigma}E - 1\right) \quad \text{[Formula 1]}$$

where σ represents flexural strength of the glass film obtained by a 3-point bending test, T represents a thickness of the glass film, and E represents a Young's modulus of the glass film.

2. The glass roll according to claim 1, wherein the glass film has a thickness of 1 μm or more and 200 μm or less.

3. The glass roll according to claim 1, wherein each end surface in a width direction of the glass film includes a cut surface which is cut by laser splitting.

4. The glass roll according to claim 1, wherein the glass film is wound into a roll while being superposed on a protective sheet.

5. The glass roll according to claim 1, wherein the glass film is formed by a downdraw method.

6. A manufacturing method for a glass roll which is formed by winding a glass film into a roll, the manufacturing method comprising winding the glass film so that a minimum winding radius (R) of the glass film satisfies the following relation:

$$R \geq \frac{T}{2}\left(\frac{2.3}{\sigma}E - 1\right) \quad \text{[Formula 2]}$$

where σ represents flexural strength of the glass film obtained by a 3-point bending test, T represents a thickness of the glass film, and E represents a Young's modulus of the glass film.

* * * * *